Figure 1:
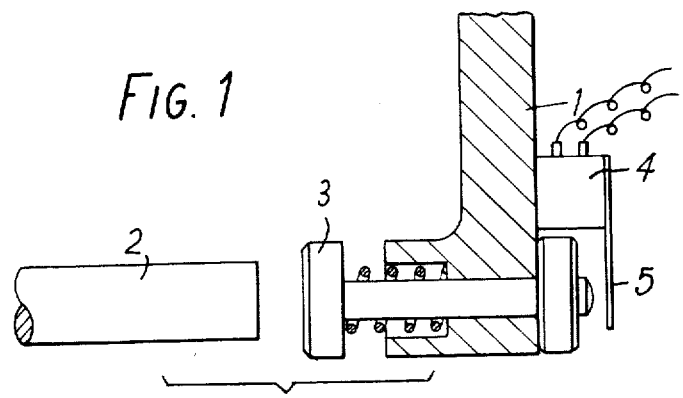

United States Patent [19]
Sirk et al.

[11] 3,886,375
[45] May 27, 1975

[54] COUNTING SYSTEM

[75] Inventors: Walter Ulo Sirk, Oakham; Douglas Brian Street, Melton Mowbray, all of England

[73] Assignee: The Production Engineering Research Association of Great Britain, Leicestershire, England

[22] Filed: Dec. 11, 1973

[21] Appl. No.: 423,785

[52] ................................ 307/112; 340/324
[51] Int. Cl. ........................................... H01h 35/00
[58] Field of Search.................... 340/324, 378, 168; 307/112, 113, 115, 119, 138, 139, 140, 149; 198/40

[56] References Cited
UNITED STATES PATENTS
2,968,284  1/1961  Ellis, Jr. .......................... 307/115 X

*Primary Examiner*—Herman J. Hohauser
*Attorney, Agent, or Firm*—Larson, Taylor & Hinds

[57] ABSTRACT

System for counting components produced on machine tools such as automatic and semi-automatic lathes. Comprises first switch or valve operated by a component positioned in the machine tool and second switch or valve operated when machine cycle is initiated. Both switches or valves are connected to a counter in such manner that a count is recorded only if both switches or valves are operated.

8 Claims, 8 Drawing Figures

COUNTING SYSTEM

This invention is concerned with counting systems used in association with machine tools to record the number of components machined.

Primarily, the invention has been devised in connection with component counting systems for automatic and semi-automatic lathes used for machining material in bar form (known as bar stock), in which the length of stock fed from the chuck or collet of the machine each time a component is to be produced is controlled by abutment with a barstop. It is, however, to be understood that the invention is not limited in this respect.

Most conventional counting systems of the kind referred to operate by counting successive machine cycles. However, they have the disadvantage that the count can be falsified by running the machine empty. To overcome this problem it has been proposed to provide a chute to receive machined components discharged from the machine and to count the components passing along the chute by means of a proximity switch.

Chutes are, however, inconvenient in that they restrict access to the machine, hinder efficient swarf removal and are sometimes themselves affected by swarf accumulation.

An object of the present invention is to provide a component counting system which avoids these disadvantages. A further aim is to provide a noval form of barstop for use in an automatic or semi-automatic lathe to which said component counting system is applied.

According to the invention the system comprises first switch means positioned to detect the presence in the machine of a component to be machined, second switch means arranged to be operated by the machine after initiation of the machine cycle, and a counter to which said first and second switch means are connected so that a count is recorded only if both the first switch means detects the presence of a component and the second switch means is operated.

It will be appreciated from this that a count will only be obtained when a component is present in the machine tool and when the machine cycle has been initiated.

The method of operating the switch means will obviously depend on the type of machine tool to which the system is applied. In the case of an automatic or semi-automatic bar or capstan lathe having a barstop (to which reference will hereinafter be confined for convenience) the first switch means will conveniently be associated with the barstop so as to be operated upon abutment of the bar stock thereagainst.

The second switch means will be operated by or from a part of the machine tool (e.g. a cam or slide) which moves after the machine cycle has been initiated.

Although a conventional barstop fitted with appropriately positioned switch means may be employed, a specially-adapted barstop is preferably used. In one embodiment, the barstop may incorporate a spring-loaded element which is contacted and displaced to a limited extent against its spring loading by the bar stock as the latter moves into position and is arranged to thereupon operate the first switch means. When the stock is removed from the machine or the barstop is retracted to allow subsequent operations to be carried out, the spring-loaded element returns to its initial inoperative position. Displacement of the spring-loaded element against its spring may be limited by a shoulder or other form of dead stop.

Alternatively, the barstop may be formed with a recess or groove to receive the infed bar stock, in which case the switch means will be mounted inside the recess or groove for contact by the stock.

The system may be pneumatic in operation, in which case a pneumatic counter will be employed. Conveniently the counter will be operated by a source of compressed air controlled by a spool valve, itself controlled by two poppet valves constituting said first and second switch means.

Alternatively, the system may be electrical in operation, in which case the first and second switch means will be microswitches connected to an electrical counter through a latching relay.

Figure 6:
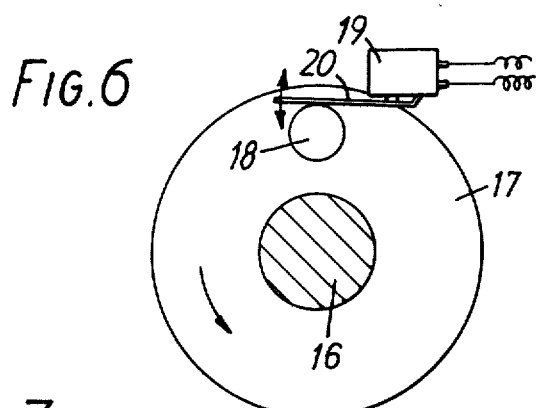
Figure 7:
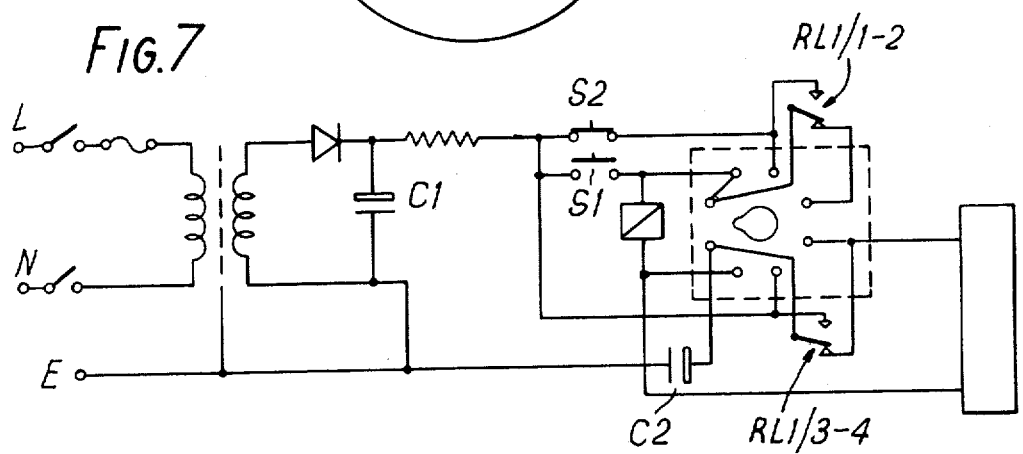
Figure 8:
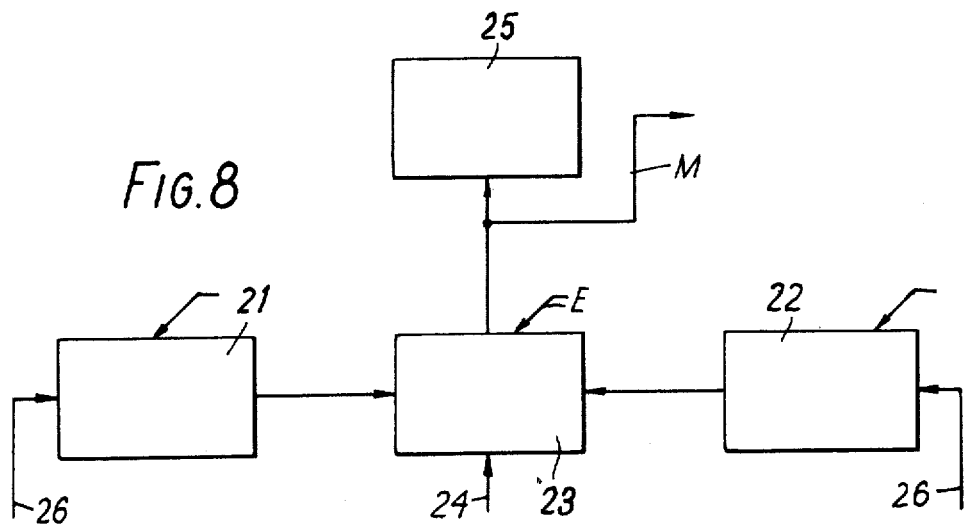

To facilitate understanding of the invention and enable it to be readily carried into practice, reference will now be made to the accompanying diagrammatic drawings which illustrate various embodiments thereof by way of example. In the drawings:

FIGS. 1 to 5 show alternative forms of barstop for use in automatic or semi-automatic lathes fitted with a counting system according to the invention, FIG. 6 is a diagrammatic illustration of one method of operating the second switch means referred to above, FIG. 7 is a circuit diagram of an electrical counting system, and, FIG. 8 is a block diagram showing one example of a pneumatic counting system.

Referring first to FIGS. 1 to 4, the main body of the barstop is denoted 1 and is mounted in a conventional fashion in the lathe in question. Numeral 2 denotes bar stock inserted into the lathe to a position defined by abutment with the barstop.

In FIG. 1, the portion of the barstop to be contacted by the stock is formed by a spring-loaded pin 3 arranged to be displaced against its spring loading as the stock moves into position for machining. Any appropriate form of switch or valve may be mounted either inside the barstop body 1 or on the external surface of the latter so as to be operated when pin 3 is depressed. In the illustrated example, a microswitch 4 is mounted externally on the body 1 its operating arm 5 being positioned for operation by the pin 3 as the latter is displaced against its spring loading.

Figure 2:
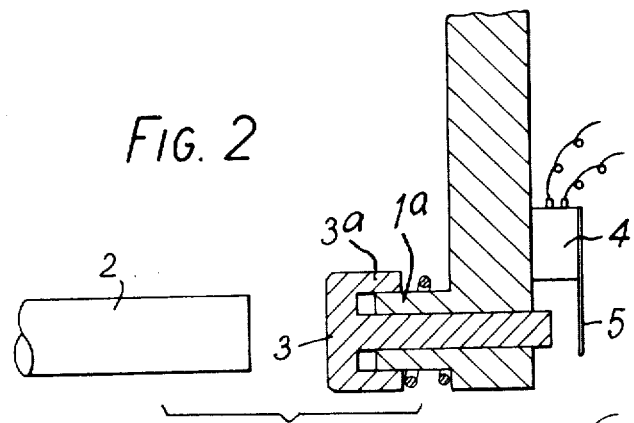

FIG. 2 shows a similar arrangement in which the pin 3 is formed with an integral sleeve portion 3a which slides on a cylindrical formation 1a on body 1. Here again, a switch 4 is mounted on the barstop body for operation when the pin 3 is depressed.

Figure 3:
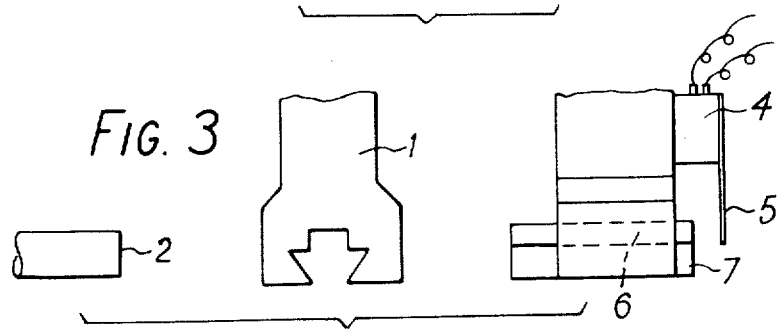

FIG. 3 shows an arrangement in which the body 1 is formed with a dovetail slideway 6 which receives a spring-loaded slide 7 (spring not shown) of complementary shape in cross-section. The arrangement is such that the bar stock 2 displaces the spring-loaded slide 7 to operate a switch 4 mounted on the body 1.

Figure 4:
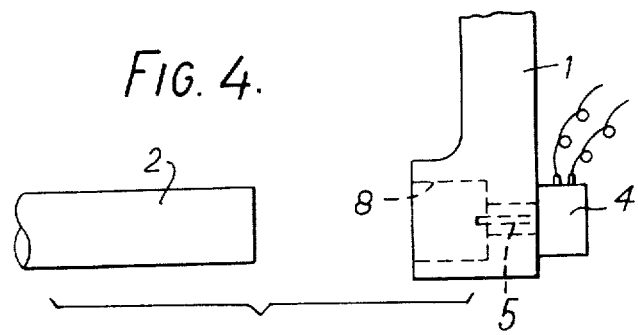
Figure 5:
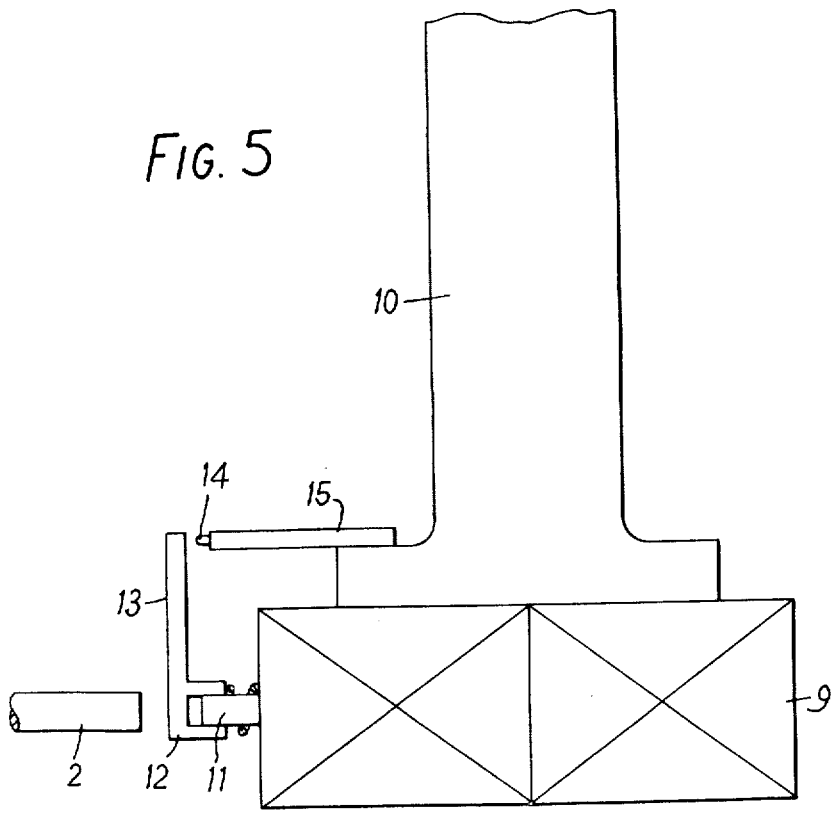

In the embodiment of FIG. 4 the barstop body 1 is formed with a recess 8 which may receive a switch or valve having an actuator which protrudes from the recess so as to be operated by the bar stock as it moves into position, movement of the bar stock being limited by abutment with the front face of the barstop. In another case, as shown, a microswitch 4 is mounted on the body 1 of the barstop so that its operating plunger 5 projects into recess 8 for operation by the stock 2.

It will be appreciated that, in the case of a capstan or turret lathe, difficulties are encountered in connecting a supply of compressed air (in the case of a pneumatic system) or electricity to the turret. The arrangement shown in FIG. 5 has been devised to avoid this difficulty.

In this view, the turret is denoted 9, being rotatably mounted on a fixed part 10 of the lathe. The barstop is mounted in one of the positions of the turret and comprises a fixed pin 11, and a spring-loaded sleeve 12 which is slidably mounted on the pin.

An arm 13 projects outwardly from sleeve 12 to operate a switch 14 carried by a support 15 on the fixed part 10 of the lathe. As will be appreciated from the drawing, the arrangement is such that when sleeve 12 is depressed by the bar stock, the arm 13 operates the switch 14.

Although the preceding description refers to microswitches mounted on the barstop, it is to be understood that these switches could be replaced by valves operated in exactly the same fashion as described.

In any event, as explained above, the switch or valve mounted on the barstop produces a first signal indicating that a component is present in the lathe and second switch means are provided to produce a second signal indicating that the cycle of the lathe has been initiated. FIG. 6 illustrates one way inwhich the second signal can be derived.

In this view, numeral 16 denotes a shaft in the lathe which performs one complete revolution for each operating cycle of the lathe. This shaft may be the normal shaft provided in automatic lathes for operating the indexing mechanism. Mounted on shaft 16 is a disc 17 which carries an eccentrically mounted pin 18. Adjacent disc 17 is a microswitch 19 having an operating arm 20 designed to be deflected by pin 18 to operate the microswitch once during each complete revolution of disc 17. It will be appreciated that FIG. 6 shows a condition in which disc 17 is partway through a revolution.

It will be evident to a person skilled in the art that there are many other ways of producing this second signal and that FIG. 6 shows one example only. In another case a switch could be positioned adjacent the slide of the lathe or of the machine tool, to be operated once each time the slide is operated.

Reference will now be made to FIG. 7 which is a circuit diagram of one form of electrical counting system in accordance with the invention. The diagram shows two switches S1 and S2 which are respectively normally open and normally closed as shown. S1 is the switch mounted on the barstop of the lathe and may, for example, be the switch 4 in any of FIGS. 1 to 4 or the switch 14 in FIG. 5. S2 is the switch which is operated once during the machine cycle and may for example be the switch 19 in FIG. 6. The circuit also includes a latching relay RL1 having contacts RL1/1-2 and RL1/3-4 and an electrical counter C.

In operation, switch S1 is initially closed as the bar stock moves into contact with the barstop. This energises the coil of relay RL1 which completes the circuit to the latching contact RL1/1 and also causes a condenser C2 to charge via contact RL1/4.

As the machine cycle commences, switch S2 will be opened, thereby breaking the latching circuit via contact RL1/2 and de-energising the relay. This allows condenser C1 to discharge into the counter via contact RL1/3 so that the counter registers one increment. At the end of the cycle of operations, the stock will be removed and the circuit will return to its normal condition ready for the next cycle.

Reference will now be made to FIG. 8 which illustrates, in block diagram form, an example of a pneumatic counting system according to the invention. In yet another embodiment, the system could be hydraulic.

In any event, in FIG. 8, numeral 21 denotes a poppet valve mounted on or in the barstop of an automatic or semi-automatic lathe, e.g. in any of the ways illustrated in FIGS. 1 to 5. Also fitted to the machine tool is a further poppet valve 22 arranged to be operated upon movement of the slide of the lathe. The poppet valves 21 and 22 are both connected to a spool valve 23 which is incorporated in the air supply 24 to a pneumatic counter 25. Sources of compressed air are also connected to the poppet valves 21 and 22 as denoted by numeral 26.

In use, poppet valve 21 will be operated when the bar stock is located in the machine against the barstop. This will open spool valve 23 and admit pressure to the counter 25. Then, as the operative commences the cycle of machine operation, valve 22 will be operated to close the spool valve 23 so that the compressed air in the line between the latter and the counter 25 will exhaust through the exhaust port E of valve 23. This causes the counter 25 to be operated by one increment.

The pressure pulse applied to the counter can also be used for monitoring purposes (e.g. at a central control serving several lathes) by means of an electrical circuit (not shown) connected at M as shown in FIG. 8, e.g. by means of a pressure-operated electrical switch.

We claim:

1. A component counting system for a machine tool, comprising: first switch means positioned to detect the presence in the machine of a component to be machined; second switch means arranged to be operated by the machine after initiation of the machine cycle; and a counter to which said first and second switch means are connected so that a count is recorded only if both the first switch means detects the presence of a component and the second switch means is operated.

2. A system according to claim 1, wherein the first switch means is associated with the barstop of an automatic or semi-automatic bar or capstan lathe.

3. A system according to claim 1, which is pneumatic in operation, wherein the first and second switch means are poppet valves connected to a pneumatic counter through a spool valve.

4. A system according to claim 1, which is electrical in operation, wherein the first and second switch means are microswitches and are connected to an electrical impulse counter through a latching relay.

5. A system according to claim 1, wherein the input to the counter is connected to a monitoring device.

6. For use in a system according to claim 2, a barstop which is fitted with switch means arranged to be operated by bar stock as it moves into position for machining.

7. A barstop according to claim 6, which incorporates a spring-loaded element arranged, when the barstop is in use, to be displaced to a limited extent against its spring loading by the bar stock as the latter moves into position, and to thereupon operate the switch means.

8. A barstop according to claim 7, which is mounted on the turret of a capstan or turret lathe, wherein said spring-loaded component carries an outwardly-projecting arm arranged, when the component is displaced against the spring action, to operate switch means mounted on a fixed part of the lathe.

* * * * *